April 21, 1970   D. W. McKEE ETAL   3,507,512
BOGIE MEANS FOR VEHICLES

Original Filed Dec. 22, 1965   3 Sheets-Sheet 1

INVENTORS
DALE W. McKEE
WILLIAM A. WILLIAMSON
BY
*J. P. Wiemler*
ATTORNEY

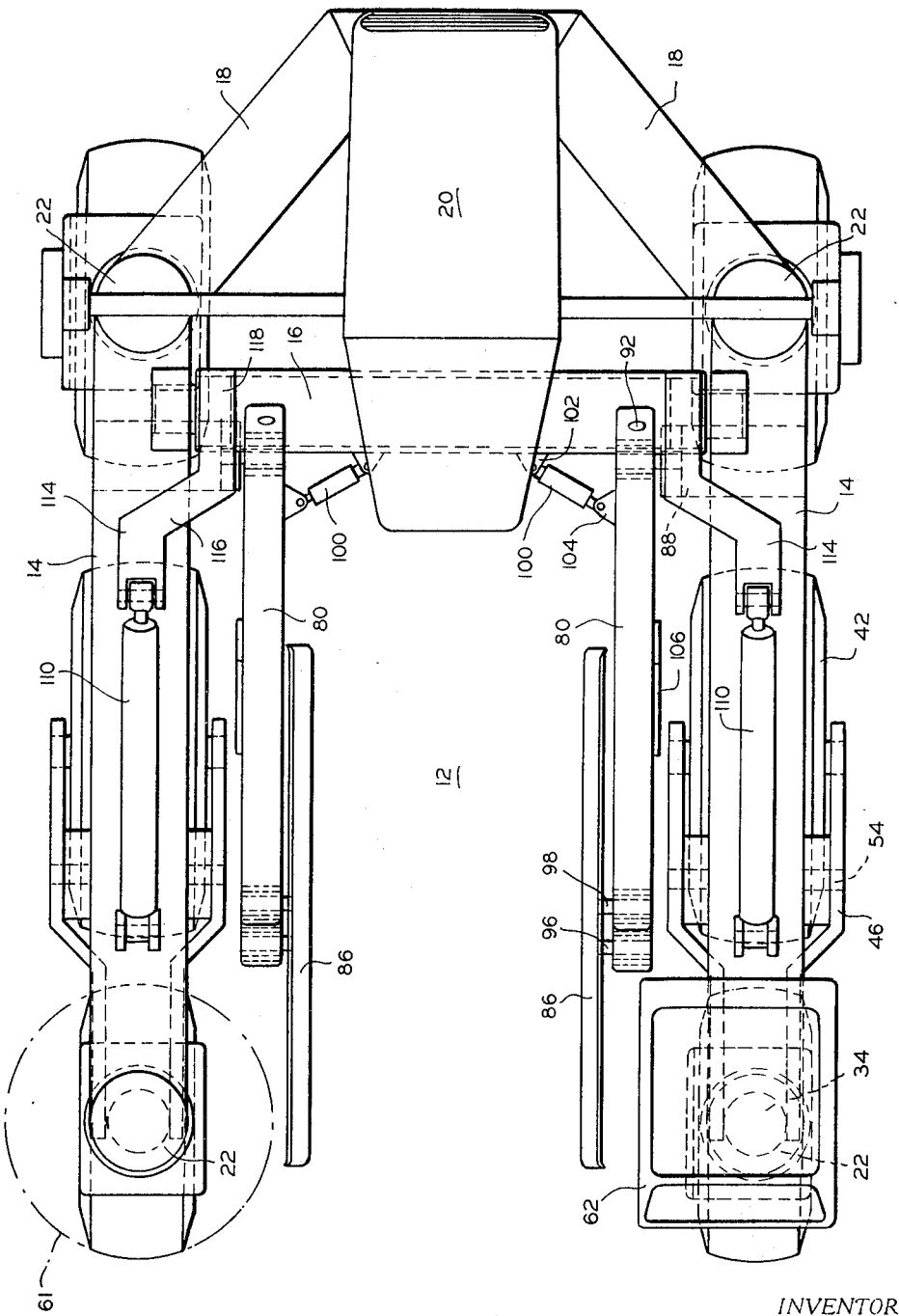

United States Patent Office 3,507,512
Patented Apr. 21, 1970

3,507,512
BOGIE MEANS FOR VEHICLES
Dale W. McKee and William A. Williamson, Battle Creek, Mich., assignors to Clark Equipment Company, a corporation of Michigan
Original application Dec. 22, 1965, Ser. No. 515,581, now Patent No. 3,387,726, dated June 11, 1968. Divided and this application Dec. 22, 1967, Ser. No. 692,867
Int. Cl. B62d 61/00
U.S. Cl. 280—81.5                                    11 Claims

ABSTRACT OF THE DISCLOSURE

A bogie wheel assembly which, in a preferred embodiment includes three wheels in longitudinally spaced relation on each side of a vehicle with the center wheel of each three-wheel group pivotally supported from the frame by a bogie connected to one of the other wheels which is dirigible so that the load carried by the center wheel varies as a function of the load carried by the wheel to which it is connected, the center wheel preferably being of larger diameter than the dirigible wheel and the bogie being impositively connected to the latter wheel.

---

This application is a division of our copending original application for "High Lift Straddle Carrier," filed Dec. 22, 1965, Ser. No. 515,581, now Patent No. 3,387,726.

BACKGROUND OF THE INVENTION

The field of art to which the invention pertains includes bogie connected vehicular wheels between which a load carried by the vehicle is distributed in a predetermined manner.

Although our invention is applicable to various types of vehicles we contemplate a particular usefulness thereof in straddle type van and container handling vehicles adapted to carry relatively large and heavy loads in freight yards, on docks, and the like, where space is relatively limited, and maximum carrying capacity with minimum vehicular width and turning radius is of importance. The present invention has therefore been disclosed herein as embodied in the latter type vehicle wherein the chasis includes a horizontally disposed U-shaped frame supported at each horizontally disposed leg thereof by a three-wheel group. With particular reference to vehicles of the latter type, use of a relatively large center wheel connected to one of the steer wheels of each three-wheel group by a frame supported pivoted bogie enables the steer-wheel to be of a minimum diameter for the capacity load to be handled by the vehicle, thereby enabling the design of a relatively narrow width vehicle with a short turning radius.

SUMMARY

Our invention is capable of a number of different embodiments or forms. A preferred embodiment is disclosed herein wherein a relatively large diameter wheel of each three-wheel group is located between the other two wheels on each side of a straddle-type vehicle and is mounted at one end of a first-class lever type bogie fulcrumed from the vehicle and connected at its opposite end to one of the other wheels. It is also applicable to vehicles having only two wheels on each side.

It is a primary object of the present invention to provide improved vehicular bogie means for interconnecting a pair of vehicular load support wheels so that the load is distributed between the wheels as a function of vehicular weight and load distribution.

Another object of the invention is to provide in a U-shaped straddle-type vehicle a pair of bogie connected wheels supporting each side of the vehicle and interconnected by first-class lever means, the fulcrum of which is mounted from the vehicle.

A further object is to provide in load handling vehicles a pair of bogie connected wheels supporting each side of the vehicle and so related as to provide in a vehicle of given load capacity a relatively narrow width and short turning radius.

BRIEF DESCRIPTION OF THE DRAWING

FIGURE 3 is a plan view of the vehicle as shown in FIG. 2.

DESCRIPTION OF THE PREFERRED EMBODIMENT

Figure 1:
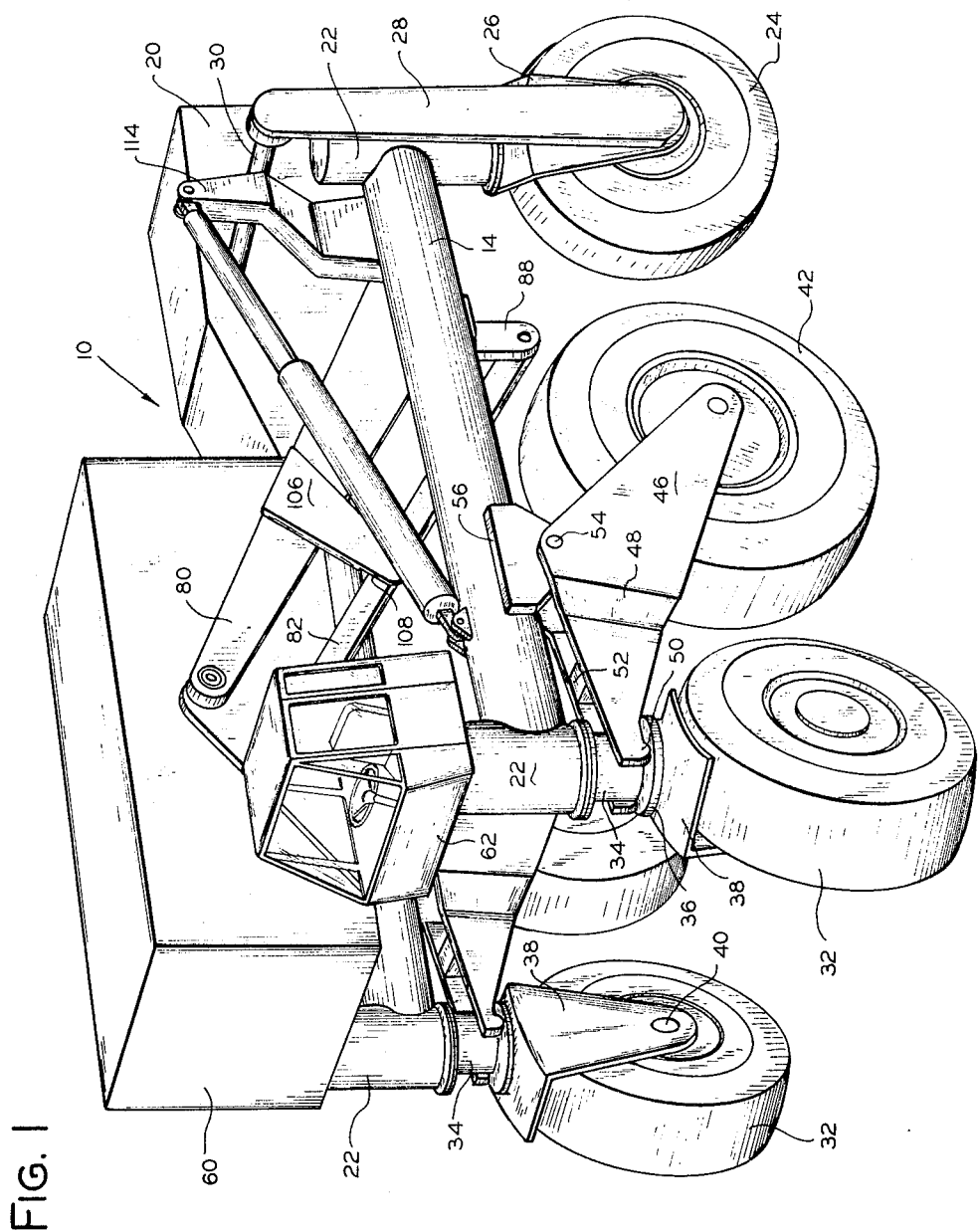
FIGURE 1 is a view in perspective of a vehicle embodying the present invention.

Referring now in detail to the drawings, a straddle carrier is illustrated generally at numeral 10 having a bay 12 open both longitudinally and vertically within a generally U-shaped framework which comprises preferably a pair of laterally spaced hollow tubular structural members 14 connected together adjacent the rear end by a hollow pivotable torque tube 16 and by a rearwardly and transversely extending hollow tubular structure 18 from the rear end of which is cantilevered a forwardly extending power train housing 20 supported from the central portion of structure 18. Vertical tubular post members 22 are located at each of the rectangularly related corners of the machine and are integrated, as by welding, with longitudinal members 14 and with the diagonally extending members 18 of the rearward support structure. Each of a pair of rear wheels 24 is mounted in known manner by a single offset bracket and axle assembly 26 which is secured to and extends outwardly and downwardly from each said post 22. An endless chain drive mechanism is operable within a cover housing 28 in known manner to drive each of rear wheels 24 from a differential drive shaft 30, each drive chain engaging a toothed drive sprocket located at each end of shaft 30 and a toothed driven sprocket on the shaft of each wheel 24. A pair of front wheels 32 are also mounted in known manner from forward corner posts 22 by means of spring actuated posts 34 received telescopically within forward posts 22 and spring urged outwardly of posts 22 so that under load the wheel support posts 34 retract within corner post 22 as a function of the loading of wheels 32. A collar 36 is secured, as by welding, to each post 34 and to inwardly and downwardly extending wheel bracket 38 to which each dirgible wheel 32 is mounted by an axle 40. If desired, rear wheels 24 may also be dirigible so that either two or four-wheel steering may be utilized. No steering system is disclosed herein since it forms no part of the present invention.

A pair of relatively large non-driven center wheels 42 are mounted on axles 44 from a pair of longitudinally extending, transversely spaced and generally triangular shaped bracket assemblies 46, offset inwardly at 48 to accommodate the difference in width of wheels 32 and 42, and having ends 50 engaging the upper sides of collars 36, each bracket assembly 46 being cross braced at 52 and pivotably supported by a pivot shaft 54 which is supported from a pair of transversely spaced brackets 56 secured to opposite sides of each longitudinal member 14. The assembly of wheels 42 and brackets 46 mounted as shown and impositively connected to wheels 32, each comprises a bogie assembly whereby vertical movement of front wheels 32 under variable load conditions imposes variable proportional loading of center wheels 42 through the functionally bell crank type bracket assemblies 46.

The construction and mounting of bogie wheels 42 first tends to equalize the loading of smaller wheels 32 under conditions in which a load 60 is unequally distributed in a direction either transverse or longitudinal of the vehicle; it also minimizes the effect of shock loading on wheels 32 as is encountered when traveling on a rough surface, and permits the design of a minimum width vehicle of particular load carrying capacity by distributing the total load in six areas in order to minimize the size of wheels and tires 32. Since van type containers are often stacked in rows, it is important in order to efficiently utilize space that the open space between the rows be minimized. A relatively narrow width vehicle of the type herein described permits such space efficiency. In addition, use of relatively large bogie wheels 42 enables the use of relatively small bogie connected steer wheels 32 so that a shorter turning radius of the vehicle 10 is possible without interference with the load handling mechanism in bay 12, to be described, because of the relatively small diameter of the circle, represented at numeral 61 (FIGS. 3), in which each wheel 32 turns about a vertical axis.

An operator's station may be located at one front corner of the vehicle to maximize visibility and control of the vehicle in the handling of loads. As illustrated, an operator's cab 62 is located atop the one forward post member 22, and is intended to house all the necessary instrumentation and control means for operating the prime mover, drive train and the load handling mechanism to be described. A steering wheel 64 and an operator's seat 66 are shown in cab 62.

Figure 2:
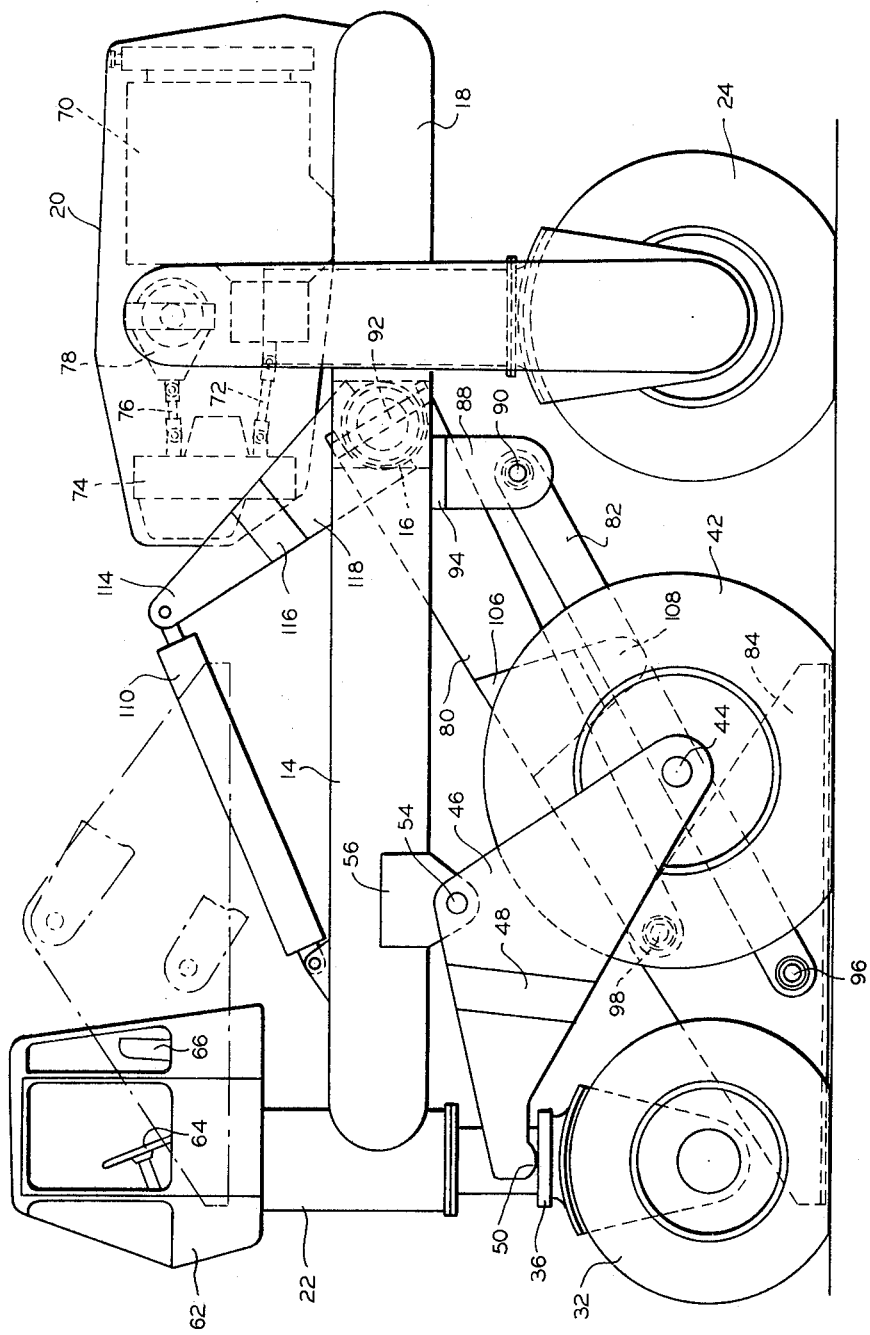
FIGURE 2 is a view of the vehicle in side elevation.

A primer mover and drive train are shown located in housing 20 in FIG. 2. An engine 70 is connected by a drive shaft 72 to a transmission assembly 74 which is connected by a propeller shaft 76 to a differential drive assembly 78 connected to opposite ones of rear wheels 24 by shaft 30 as described above. It will be noted that the drive train is so arranged on opposite sides of the differential assembly 78 that the center of gravity thereof tends to be located near the vertical centerline of the differential assembly, which minimizes off-center loading of the drive train with respect to rear wheels 24.

The load handling mechanism is located within open bay 12 and comprises a parallelogram lift linkage assembly extending longitudinaly of the bay adjacent the inner side of each longitudinal member 14. Each linkage assembly comprises upper and lower vertically aligned link members 80 and 82 a generally triangularly shaped load hook 84 pivotably mounted from the forward ends of each link 80 and 82 and having an inwardly extending ledge 86 extending longitudinally of the lower end of the load hook 84, an angle bracket 88 having pivot means 90 mounted at the lower end thereof for supporting the rearward end of link 82, and a pivot shaft 92 extending transversely of torque tube 16 at an angle as best shown in FIG. 2, on the opposite ends of which are pivotally mounted the rear bifurcated end of link 80. Each bracket 88 has an upper inwardly extending horizontal leg 94 secured to the lower side of the respective longitudinal member 14, and a vertical leg extending downwardly from the inner end thereof to which pivot member 90 is secured, the location of connecton of link 82 to pivot means 90 being below and forwardly of the horizontal axis of torque tube 16. The effective length of each link 80 is substantially equal to the length of each link 82, so that the pivot connection 96 of link 82 to load hook 84 is located below and forwardly of pivot connection 98 of link 80 to the load hook a distance which is substantially equal to the similar relationship of the axis of torque tube 16 and the connection of link 82 to pivot means 90. Thus, a parallelogram linkage is effected so that when links 80 and 82 are actuated to elevate load hooks 84 in a manner to be described, the load hooks will be maintained with ledges 86 thereof in a substantially horizontal plane throughout the range of lift.

A pair of hydraulic cylinders 100 are mounted diagonally of the corner sections formed between torque tube 16 and each upper link 80. The base end of each cylinder 100 is pivotally connected to a bracket 102 on the torque tube and the piston rod end is pivotally connected to a bracket 104 on the link member. Pump, control valve and conduit means, not shown, are utilized to actuate the pistons of cylinders 100 from the fully retracted positions shown in FIG. 3 in extension so as to actuate the parallelogram linkage assemblies and load hooks a relatively small distance outwardly in opposite directions, whereby to facilitate the engagement of the lower longitudinal corner sections of a load 60 when the carrier vehicle straddles the load. Retraction of cylinders 100 to the positions shown causes ledges 86 to be inserted beneath the container, or any bolster on which it may be mounted, and exert a lateral clamping force on opposite sides of the container for subsequent load handling operations. Preferably, a downwardly depending stop plate member 106 is secured to each upper arm 80 and extends downwardly across the outer side of each link member 82 to provide a stop member which limits movement of link members 82 transversely outwardly of the vehicle when cylinders 100 are actuated to clamp a load between load hooks 84. Link arms 82 tend to move outwardly under such conditions since both ends thereof are supported by spherical bushings. A recess 108 in stop plate 106 normally provides clearance between arm 82 and plate 106.

The lifting mechanism for actuating the parallelogram linkages and load hooks from the ground level position of FIG. 2 to the elevated position of FIG. 1 (also see the broken line position thereof in FIG. 2) comprises a pair of hydraulic lift cylinders 110 pivotally mounted on brackets 112 to extened longitudinally rearwardly of the vehicle in the vertical planes of structural members 14. As shown, each piston rod end of the lift cylinders is pivotally connected to the bifurcated upper end of a lever arm 114. Each arm 114 is offset inwardly at 116 and includes an extension 118 having a semi-circular bearing surface which is connected, as by welding, at the end thereof to the complementary cylindrical surface of torque tube 16. Extension of actuator cylinders 110 from the position illustrated in FIGS. 2 and 3 to the position illustrated in FIG. 1 causes torque tube 16 to rotate in a clockwise direction, as viewed in FIG. 2, which actuates the parallelogram linkage and load hook assembly upwardly within bay 12 to a relatively high elevation when the actuator cylinders are fully extended, while maintaining the ledges 86 of load hooks 84 horizontal whether or not a load is engaged thereby, and whether or not the distribution of the load is uniform or centered with respect to load hooks 84.

In operation, the carrier vehicle is capable of engaging van containers endwise from the forward end of the vehicle with excellent operator visibility, clamping the container and lifting the same either for transport or tiering to an elevation sufficient to stack one container atop another in successive laterally spaced rows having relatively little space therebetween. The construction enables, for example, the vehicle to straddle the lower tier with an engaged container in elevated position for stacking same while the longitudinal side portions of the vehicle are inserted in the open spaces between rows of containers. Also, the carrier vehicle is capable of handling long loads in the usual manner of straddle carriers of inverted U-shaped configuration. That is, the present carrier design can readily carry loads which extend lengthwise beyond both the front and rear ends of the vehicle, such as long pipes and the like, on bolsters engaged by the load hooks. In addition, very tall containers or other loads can be carried by load hooks 84 without requiring alteration in the height of the vehicle design, since there is no overhead interference.

It will now be appreciated by persons skilled in the art that our invention is applicable to various types of vehicles; it is disclosed herein in one type of vehicle to which it is well adapted. It enables not only the use of large capacity load handling vehicles in relatively small loading and unloading areas, but also facilitates maneuverability by the use of relatively small steer wheels. Also, it will be noted that the means of connecting bracket assemblies 46 positively to and coaxially of each wheel 42 and impositively to and non-coaxially of each wheel 32 enables the latter wheels to combine in operation with wheels 42, as above-described, while also functioning as dirigible wheels.

It will be understood by persons skilled in the art that the single embodiment disclosed herein is representative of but a single construction and arrangement of parts within the scope of the invention. Various equivalent components and elements of the structure may be readily substituted for those of the exemplary embodiment enclosed, including rearrangements and modifications which will appear to persons skilled in the art, without necessarily departing from the scope of the invention, as defined in the claims appended.

We claim:

1. A wheel suspension for a wheeled vehicle having a horizontally extending frame comprising at least two wheels on each side of the vehicle in longitudinally spaced relation supporting the vehicle, a longitudinally extending connecting means supported pivotally from each side of the vehicle and operatively connected from its opposite ends to opposite wheels of each said pair of wheels, said latter means connecting the wheels of each said pair of wheels such that the load carried by the one wheel varies as a function of the load carried by the other wheel to which it is connected by said latter means, said latter means being connected coaxially of one of the wheels of each said pair and connected non-coaxially of the other wheel, said other wheel being also supported from said frame independently of said connecting means.

2. Wheel suspension means as claimed in claim 1 wherein said coaxial connection of said latter means is connected positively to said one wheel and said non-coaxial connection of said latter means is connected impositively to said other wheel.

3. A wheel suspension as claimed in claim 1 wherein each wheel which is coaxially connected to said latter means is non-dirigible and each wheel which is non-coaxially connected to said latter means is dirigible.

4. Wheel suspension means for a motorized vehicle having a horizontally extending frame comprising at least a pair of wheels longitudinally spaced and supported from each side of the frame, said support means including a wheel lever means pivotally supported intermediate its ends from the frame, the wheels of each said pair of wheels being operatively connected to the lever means on opposite sides of the pivotal support thereof, one wheel of each said pair of wheels being larger in diameter than the other wheel, and one wheel of each said pair of wheels being also supported from said frame independently of said lever means.

5. A wheel suspension as claimed in claim 4 wherein the motorized vehicle comprises a horizontally extending U-shaped frame forming an unobstructed open load bay forwardly and vertically of the frame, said pairs of wheels being supported from opposite legs of said U-shaped frame, one wheel of each said pair being operatively connected coaxially to one end portion of the lever means and the other wheel being operatively connected non-coaxially to the other end portion of said lever means.

6. A wheel suspension as claimed in claim 4 wherein the large diameter wheel of each pair is also of larger width, and the lever means connecting the wheels of each said pair of wheels is adapted to accommodate said different wheel sizes.

7. A wheel suspension as claimed in claim 4 wherein a third wheel is supported from each side of the frame and is spaced longitudinally from each said pair of wheels in such a manner that the largest diameter wheel of each said pair of wheels is the center wheel of each three-wheel group on each side of the vehicle.

8. Wheel suspension means for a motorized vehicle having a horizontally extending frame comprising a plurality of wheels spaced longitudinally and supported from each side of the frame including bogie means operatively connected to a pair of said wheels on each side of the frame and pivotally supported from the frame, one of each said pair of wheels being dirigible and the other non-dirigible, said bogie means being operatively connected non-coaxially of each dirigible wheel and coaxially of each non-dirigible wheel, said dirigible wheel of each said pair being smaller in diameter than the non-dirigible wheel and being supported also from said frame independently of said bogie means.

9. Wheel suspension means as claimed in claim 8 wherein said bogie means comprises a first-class lever means pivotally supported from the frame and being positively operatively connected to the non-dirigible wheels and impositively operatively connected to the dirigible wheels.

10. A motorized vehicle having a horizontally extending U-shaped frame forming an unobstructed open load bay forwardly and vertically of the frame, at least a pair of wheels longitudinally spaced and supported from opposite legs of said U-shaped frame, said support means including a wheel lever means pivotally supported intermediate its ends from each of the opposite legs of said U-shaped frame, the wheels of each said pair of wheels being operatively connected to the lever means on opposite sides of the pivotal support thereof, one wheel of each said pair of wheels being larger in diameter than the other wheel, and one wheel of each said pair being operatively connected coaxially to one end portion of the lever means and the other wheel being operatively connected non-coaxially to the other end portion of said lever means.

11. Wheel suspension means for a motorized vehicle having a horizontal extending frame comprising at least a pair of wheels longitudinally spaced and supported from each side of the frame, said support means including a wheel lever means pivotally supported intermediate its ends from the frame, the wheels of each said pair of wheels being operatively connected to the lever means on opposite sides of the pivotal support thereof, one wheel of each said pair of wheel being larger in diameter than the other wheel, and a third wheel supported from each side of the frame spaced longitudinally from each said pair of wheels such that the largest diameter wheel of each said pair of wheels is the center wheel of each three-wheel group on each side of the vehicle.

References Cited

UNITED STATES PATENTS

| | | | |
|---|---|---|---|
| 936,962 | 10/1909 | Van Winkle | 280—104.5 |
| 949,071 | 2/1910 | Helmke | 280—104.5 |
| 1,856,068 | 5/1932 | Christie | 280—104.5 X |
| 2,042,780 | 6/1936 | Greer. | |
| 2,072,787 | 3/1937 | Anderson. | |
| 2,775,357 | 12/1956 | De Arment | 214—390 |
| 3,146,903 | 9/1964 | Bjorklund | 214—394 |
| 3,262,715 | 7/1966 | Abbott | 280—104.5 X |
| 3,387,726 | 6/1968 | McKee et al. | 214—390 |

KENNETH H. BETTS, Primary Examiner

U.S. Cl. X.R.

280—104.5